United States Patent [19]

Forde, Jr.

[11] Patent Number: 4,558,520

[45] Date of Patent: Dec. 17, 1985

[54] SELF-WIPING UNIVERSAL LIQUID LEVEL GAUGE

[76] Inventor: George S. Forde, Jr., 8401 Seminole Ave., Philadelphia, Pa. 19118

[21] Appl. No.: 556,264

[22] Filed: Nov. 30, 1983

[51] Int. Cl.⁴ ............................................. G01F 23/04
[52] U.S. Cl. ............................... 33/126.7 R; 15/210 B
[58] Field of Search ................. 73/290 B; 33/126.7 R; 15/210 B

[56] References Cited

U.S. PATENT DOCUMENTS

| | | | |
|---|---|---|---|
| 2,244,579 | 6/1941 | Scott | 15/210 |
| 2,451,704 | 10/1948 | Wood | 73/864.64 |
| 3,616,265 | 10/1971 | Calabrese | 15/210 B X |
| 4,017,935 | 4/1977 | Hernandez | 33/126.7 R X |
| 4,110,909 | 9/1978 | Mayr et al. | 33/126.7 R |
| 4,155,166 | 5/1979 | Rochow et al. | 33/126.7 R |
| 4,233,704 | 11/1980 | Sartorio | 15/210 B |
| 4,419,781 | 12/1983 | Meegan | 15/210 |

OTHER PUBLICATIONS

Article from The Philadelphia Inquirer dated Oct. 23, 1983, entitled "Check Your Own Oil, But Keep It Clean" (Chicago Tribune Service).

Primary Examiner—Daniel M. Yasich
Attorney, Agent, or Firm—Howson and Howson

[57] ABSTRACT

This gauge, for measuring the level of lubricating oil or other liquids such as transmission fluid, is a dipstick having a PTFE wiping block which slides along the length of the dipstick from a stop at an intermediate location to the distal end. The block serves as a cap or shield for the collar on the oil gauge-receiving opening of an engine block. It is held in place as the dipstick is removed, and oil wiped from the dipstick is automatically returned to the crankcase. The dipstick is then reinserted, and the block and dipstick are removed together for a reading. The central part of the passage in the wiping block conforms to the transverse cross-sectional shape of the dipstick while the upper end of the passage is flared so that the dipstick can easily be inserted. The lower end of the passage consists of stepped cylinders for fitting different sizes of collars of oil gauge-receiving openings. Multiple markings are provided adjacent to the distal end of the dipstick.

1 Claim, 5 Drawing Figures

U.S. Patent Dec. 17, 1985 4,558,520
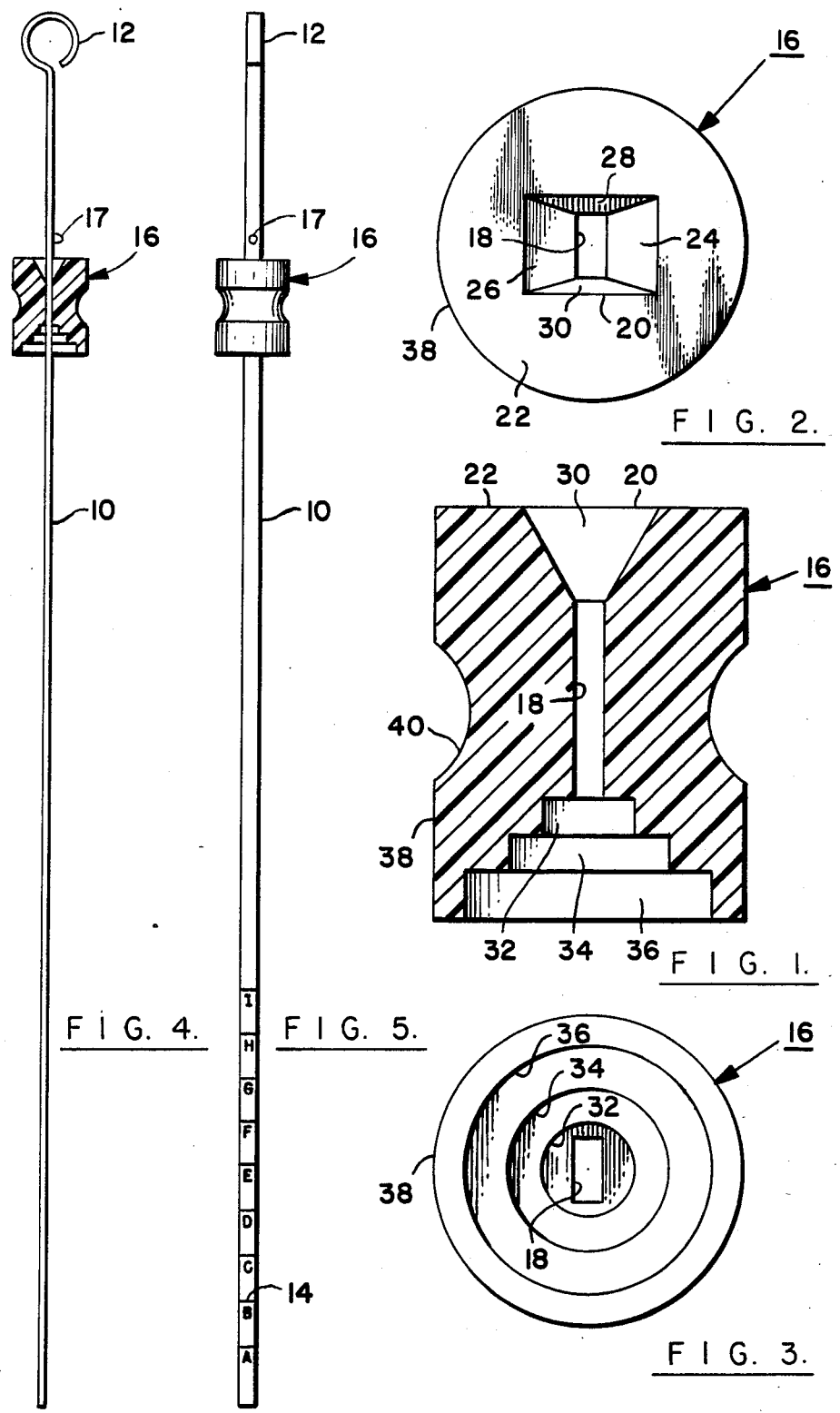

SELF-WIPING UNIVERSAL LIQUID LEVEL GAUGE

BRIEF SUMMARY OF THE INVENTION

This invention relates to liquid level gauges, and more specifically to oil level gauges of the type commonly known as "dipsticks", used for measuring or checking the level of lubricant in internal combustion engines. The invention, while primarily useful for checking lubricant level in automobile engines, is usable wherever a dipstick-type liquid level gauge may be used. For example, it can also be used to check the level of transmission fluid in an automatic transmission, or the level of brake fluid in a braking system.

The conventional dipstick is a simple metal rod which extends through an opening in the engine block into the crankcase. The opening in the engine block is usually provided with a narrow cylindrical collar, and the dipstick usually has a shield built onto it which fits over the collar. This shield prevents the escape of oil and fumes, and preestablishes a limit on the extent to which the dipstick can enter the engine crankcase.

In checking the oil level in an automobile, the owner or service station attendant, as the case may be, removes the dipstick from the engine block. As it is typically covered with oil due to operation of the engine and motion of the vehicle, it is not possible to take a reading immediately. Therefore, the dipstick is wiped, using a rag or paper towel. It is then reinserted to its full extent into the engine, and withdrawn a second time. The oil level within the engine is then read by noting the extent to which the dipstick is coated with oil. Suitable permanent markings are provided on the dipstick for this purpose.

The wiping step requires a rag, paper towel or other suitable means for removing oil from the dipstick. A supply of wipers, therefore, must be kept on hand, and a receptacle for discarded wipers must also be provided. Unless conventional wipers are used carefully, oil is likely to come into contact with shoes and clothing. While this is not usually a problem for service station attendants, it does present a problem for the motorist, particularly because the increasing popularity of self-service gasoline stations makes it necessary on occasion for the motorist himself to check the oil level in his vehicle. The spilling of oil in wiping an oil gauge also causes unsightly oil marks, may cause harm to some surfaces, and is ecologically bothersome, and, to a slight extent wasteful.

An approach to the problem of wiping an oil dipstick is described in U.S. Pat. No. 2,244,579, dated June 3, 1941. The patent describes an oil gauge rod wiper in which absorbent material is held between spring-loaded jaws which can be spread apart by manipulation of a handle. The wiper can be hung on a hook, or attached to a rod or bar at a convenient location in the automobile. In use, the jaws are spread apart, and the oil-coated dipstick is placed between the jaws and drawn through the absorbent material. In the device of U.S. Pat. No. 2,244,579, the absorbent material must be replaced from time to time.

An object of the present invention is to overcome the problems of conventional dipstick wipers using a simple structure which does not require a replaceable liquid-absorbing element. It is also an object of the invention to provide an inexpensive self-wiping liquid level gauge which is easy to use and suitable for any of a wide variety of engines and other equipment, either as original equipment or as a replacement part.

The liquid level gauge in accordance with the invention comprises an elongated rod-like element having proximal and distal ends, and having a substantially uniform transverse cross-section throughout a portion of its length extending from the distal end at least to an intermediate position along its length. The elongated rod-like element has at least one visible liquid level marking on the uniform portion of its length, though it may have a series of such markings. A wiper is arranged to slide along the portion of the elongated rod-like element at least from a location on the side of the liquid level marking remote from the distal end to the distal end. Further, the wiper is slidably removable from the elongated element over its distal end. The wiper comprises a block having two opposite ends with an internal passage extending from one of the opposite ends to the other. The block is preferably, but not necessarily, a solid molded block of heat and oil-resistant synthetic resin material such as PTFE. The passage within the block has rigid walls which conform to the cross-sectional shape of the uniform portion of the elongated rod-like element so that the block, as it slides along the elongated element toward the distal end, cleans liquid from the elongated element by pushing the liquid ahead of itself.

In use in an automobile engine, the block remains in contact with the oil gauge collar on the engine block during a first withdrawal of the elongated element. Excess oil flows back into the engine block as the elongated element is withdrawn. The elongated element is then reinserted through the wiper block into the oil gauge opening until a stop on the elongated element engages the wiper block to limit the extent to which the distal end of the elongated element can project from the internal passage of the wiper block into the crankcase of the engine. Then, both the elongated element and the wiper block are removed simultaneously, with the stop on the elongated element still in contact with the wiper block. The oil level is then read, and the elongated element and wiper block replaced in the engine. This completely eliminates the need for a disposable wiper and the other difficulties noted above.

The end of the wiper block passage which faces the proximal end of the elongated element is flared to receive the distal end of the elongated element more easily. The end of the internal passage of the wiper block which faces the distal end of the elongated element is in the form of a cylindrical opening which fits over the oil gauge-receiving column on the engine block so that the wiper block serves as a shield when the gauge is in place. Where the gauge in accordance with the invention is intended as a replacement part, the distal end opening of the wiper block preferably comprises a stepped series of coaxial cylinders so that at least one of the cylinders will closely fit the oil gauge-receiving collar on the engine.

Various objects and advantages of the invention, other than those specifically mentioned above, will be apparent from the following detailed description when read in conjunction with the drawings.

BRIEF DESCRIPTION OF THE DRAWINGS

FIG. 1 is a sectional view of a typical wiper block in accordance with the invention taken longitudinally through the passage thereof;

FIG. 2 is a top plan view of the wiper block of FIG. 1;

FIG. 3 is a bottom plan view of the wiper block of FIG. 1;

FIG. 4 is a sectional view showing the wiper block on an elongated oil gauge rod; and FIG. 5 is an elevational view of the apparatus of FIG. 4, as viewed from the right-hand side thereof.

DETAILED DESCRIPTION

While this invention will be described with reference to an embodiment specifically adapted for use in checking lubricant level in an automobile engine, it should be understood that the invention is useful in many other applications such as in automotive transmission fluid measurement, and in fluid level measurement in stationary mechanical equipment.

As shown in FIGS. 4 and 5, an oil level gauge in accordance with the invention comprises an elongated rod-like element 10 having a grasping loop 12 formed at its proximal end, and having a series of engraved markings at its distal end, one such marking being indicated at 14.

Wiping block 16 is a solid block of oil-resistant and heat-resistant synthetic resin. PTFE is an example of a suitable material for block 16. The block is slidable along element 10 from the distal end to the location of projection 17, which is formed on the rod at an intermediate position along its length. Projection 17 can be formed by punching, or by bending or welding or any of a wide variety of suitable processes. The projection serves as a stop, limiting the extent to which the distal end of the rod can project below block 16. Block 16, therefore, can serve in much the same manner as the shield of a conventional oil dipstick.

The elongated element 10 has a substantially uniform transverse cross-section throughout the portion of its length extending from its distal end to projection 17. In the case of the elongated element of FIGS. 4 and 5, the cross-section is rectangular. Of course, any of a wide variety of alternative cross-sectional configurations can be used. It is desirable that the elongated element have at least one comparatively broad flat side for its oil-level markings so that they can be read easily. The fact that the markings shown in FIG. 5 are engraved does not materially affect the uniformity of the cross-section of the elongated element. Although in the case of an oil gauge used as original equipment, multiple markings would not be necessary, multiple markings are desirable where the oil gauge is used as a replacement. These markings can be designated by different letters or numbers, and the motorist can make a note of the letter or number which corresponds to a full oil reservoir.

As shown in FIGS. 1, 2 and 3, the wiping block 16 has a central passage extending from one of its ends to the other. This central passage receives elongated element 10, as shown in FIG. 4. Intermediate part 18 of the central passage is rectangular in cross-section, and its walls are rigid because the block is of solid material. The walls conform to the transverse cross-sectional shape of elongated element 10 so that part 18 of the passage fits element 10 closely. Because of this close fit, the wiping block can push oil ahead of it as the elongated element is withdrawn through the block.

The upper opening 20 of the passage, which is centered on end face 22 of block 16, is flared, being defined by oblique walls 24, 26, 28 and 30, as shown in FIG. 2. The elongated element is normally grasped at loop 12, and therefore the position of its distal end is not easily controlled. The flaring of the opening in the wiper block makes it easy to insert the elongated element into the wiper block passage even though the exact position of its distal end is not well controlled.

The lower opening of the wiper block passage can be in the form of a single cylindrical opening coaxial with the centerline of the rectangular part 18 of the passage. This is satisfactory in original equipment, as the diameter of the cylindrical opening can be chosen so that it fits snugly over the dipstick-receiving collar on the engine block.

In the case where the oil gauge is a replacement part, however, the lower opening desirably comprises a stepped series of circular cylinders such as cylinders 32, 34 and 36, as shown in FIGS. 1 and 3. The lowermost cylinder 36 is the largest, and the cylinders become successively smaller in diameter in the direction approaching the lower end of the rectangular part 18 of the passage. These cylinders are all coaxial with one another and with the centerline of rectangular part 18 of the passage. Depending on its size, the oil gauge-receiving collar on the engine block will enter one of these cylinders, which will fit over it closely and serve as a shield to prevent the escape of oil and fumes during operation of the engine.

In the case of a gauge used as a replacement part, the wiper preferably has stepped cylinders at its lower end, and the elongated element preferably has multiple markings which are arbitrarily numbered or lettered. Before the gauge is used for the first time, a determination is made of which marking corresponds to a full oil reservoir, and which marking indicates that another quart or liter of oil should be added. This can be done experimentally by the motorist, or information can be supplied by the gauge manufacture.

The exterior surface 38 of the wiping block is preferably cylindrical, except that it has an annular groove 40 for facilitating its manipulation.

The oil gauge is normally assembled as shown in FIGS. 4 and 5, and installed in an engine with wiper block 16 covering the oil gauge-receiving collar, and the elongated element extending downwardly into the engine crankcase. Limiting projection 17 rests against one of the walls of the flared upper opening of the wiping block. Thus, the gauge projects into the crankcase to a predetermined extent.

When the oil level in the engine is to be checked, the motorist or service station attendant grasps the wiper block 16 with one hand, grasps loop 12 at the proximal end of the elongated element, and withdraws the elongated element from the wiper block completely. In the process of withdrawal, the elongated element is wiped clean of oil by the wiper block, and the oil removed from the elongated element flows back into the engine crankcase through the oil gauge-receiving collar, with which the wiping block is still in contact. The elongated element of the oil gauge being now clean, is reinserted through the wiping block while the block is still in place on the collar of the oil gauge-receiving opening. The elongated element is thrust downwardly until its projection 17 contacts the wiping block. (Alternatively, the wiping block can be removed from the engine for reinsertion of the elongated element into the wiping block, and the elongated element inserted thereafter into the gauge-receiving opening until the wiping block engages the collar of the opening.) The wiping block and elongated element are then withdrawn together by grasping the wiping block. The oil level can then be read against the markings adjacent to the distal end of the elongated element. The elongated element can then be reinserted into the gauge-receiving opening on the engine block, and the wiping block positioned over the collar to serve as a shield.

The wiping block can be made by machining, but is more readily and inexpensively made by molding, particularly if the elongated element and the opening which conforms to it have cross-sections other than circular. The elongated element can be made of metal such as steel, or can be made of a molded, heat and oil-resistant synthetic material such as PTFE. If made of a light-colored material such as PTFE, the markings can be made dark in color for contrast and easy readability.

Various modifications can be made both in the materials and in the internal and external configuration of the wiping block as well as in the materials and configuration of the elongated dipstick element without departing from the invention as defined in the following claims. For example, the dipstick element need not have a grasping loop, as other grasping provisions can be made. In the case of a molded dipstick element, the stop projections can be configured to fit into and fill the flared opening of the wiping block completely.

I claim:

1. A gauge for measuring liquid levels in a liquid container such as a fuel tank comprising an elongated element having proximal and distal ends and having a substantially uniform transverse cross-section throughout a portion of its length extending from the distal end at least to an intermediate position along its length, at least one visible marking on said portion, and a wiper, arranged to slide along said portion of the elongated element, from a location on the side of the marking remote from the distal end to the distal end, and being slidably removable from said elongated element over said distal end, the wiper comprising a block having two opposite ends and having an internal passage extending from one of said opposite ends to the other, at least a portion of the passage having rigid walls conforming to the cross-sectional shape of said portion of the length of the elongated element, and the end of the internal passage of the wiper which is nearest to the distal end of the elongated element when the elongated element extends through the passage, being in the form of a series of stepped coaxial cylinders all of which are substantially coaxial with and larger than, said portion of the passage having rigid walls conforming to the cross-sectional shape of said portion of the length of the elongated element.

* * * * *